Patented May 4, 1948

2,441,066

UNITED STATES PATENT OFFICE 2,441,066

PROCESS FOR OBTAINING POLYMERIC SILICON COMPOUNDS

William E. Hanford, Easton, Pa., assignor to E. I. du Pont de Nemours & Company, Wilmington, Del., a corporation of Delaware No Drawing. Application July 23, 1945,
Serial No. 606,703

5 Claims. (Cl. 260—46.5)

This invention relates to new silicon-containing products and more particularly to new polymeric silicon compounds. Still more particularly the invention relates to polysilicon esters.

This application is a continuation-in-part of my application S. N. 339,178, filed June 6, 1940, now Patent Number 2,386,793.

There has not been previously described any process for preparing polymeric materials which are characterized by having a substantial amount of silicon ester group wherein the silicon is further linked to carbon atoms. The silicon-carbon bond is one of the strongest bonds of either silicon or carbon compounds. Accordingly polymeric materials having substantial amounts of such bonds tend to be more inert than similar polymeric materials without such bonds.

This invention has an object the preparation of silicon-containing products, particularly polymers, which have a substantial amount of silicon ester groups wherein the silicon is further linked to carbon atoms. Other objects will appear hereinafter.

The above object is accomplished by reacting a substance containing a plurality of alcoholic hydroxyl groups, in which the hydroxyls are attached to a hydrocarbon residue, with a hydrocarbon halo silicane of the formula $R_nSiX_{4-n}$ where R is a hydrocarbon radical and X is a halogen, $n$ having the value of from 1 to 3.

This reaction can be illustrated by the formation of a polymeric product from a dihydric alcohol, such as ethylene glycol, with a dihydrocarbon dihalosilicane by which reaction there is produced a linear polymer which has the recurring unit

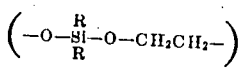

The reaction can be carried out by contacting the silicane and polyhydric compound at room temperature or below and up to temperatures as high as 400° C. In order that the reaction should not be unduly slow it is desirable that the reaction temperature be at least 25° C. and preferably between 30° C. and 300° C. The reaction is readily carried out in the presence or absence of an inert solvent or diluent.

The following examples, in which the parts are by weight further illustrate this invention.

Example I

A mixture of 300 parts of chloroform, 11 parts of fully hydrolyzed polyvinyl alcohol, and 36 parts of methyl silicon trichloride was stirred and heated at 40° C. for 24 hours. Hydrogen chloride was liberated during the reaction. The mixture was cooled and the material removed by filtration and washed with methanol. The powder was insoluble in chloroform, methanol, benzene, 75% aqueous acetic acid, water and 1 normal aqueous sodium hydroxide. It contained 4.35% silicon.

Example II

A mixture of 300 parts of chloroform, 8.5 parts of fully hydrolyzed polyvinyl alcohol and 27 parts of methyl silicon tribromide was stirred at room temperature for 2 hours followed by heating with stirring for 2 hours at 45 to 50° C. with the liberation of hydrogen bromide throughout the heating period. Thirty parts of methanol was then added and the mixture heated to reflux to remove unreacted silicon halide. After cooling the product was filtered, washed with methanol and dried at 100° C. The product contained 5.94% silicon and was insoluble in the solvents mentioned in the previous example.

Example III

A mixture of 250 parts chloroform, 11 parts fully hydrolyzed polyvinyl alcohol and 26.5 parts dimethyl silicon dibromide was stirred at room temperature for 1½ hours followed by stirring for 1 hour at 45 to 55° C. During the reaction hydrogen bromide was liberated. The mixture was then treated with 20 parts methanol and heated to reflux, after which the solid was removed by filtration and washed with methanol. After drying at 50° C. there was obtained 13 parts of a tan powdery product which had a silicon content of 7.68%.

Example IV

A mixture of 4.4 parts fully hydrolyzed polyvinyl alcohol, 6 parts allyl silicon trichloride and 16 parts benzene was heated at 70° C. for 2½ hours. The reaction product was removed by filtration, washed with methanol and dried at 100° C. There was obtained 4.8 parts of the allyl silicon derivative which was insoluble in boiling water.

Example V

A mixture of 4.4 parts of fully hydrolyzed polyvinyl alcohol, 9 parts of an allyl silicon chloride which boiled at 94-95° C. and 16 parts of benzene was heated at 70° C. for 2½ hours. The reaction product was removed by filtration, washed with methanol and dried at 100° C. There was obtained 4.7 parts of a brown powder which was insoluble in boiling water.

Example VI

A mixture of 3 parts analytical grade "soluble" starch, 6 parts allyl silicon trichloride and 16 parts benzene was heated at 70° C. for 2½ hours. The reaction product was removed by filtration, washed thoroughly with methanol and dried at 100° C. The yield of the allyl silicon derivative of starch was 3.3 parts. The product was a dark gray powder insoluble in boiling water.

The silicon containing polymers can be prepared from any polyhydric alcohol and a hydrocarbon silicon halide having the general formula $R_nSiX_{4-n}$ where $n$ is a positive integer having a value of from 1 to 3 and where X is a halogen and R is a hydrocarbon radical. The hydrocarbon radical can be aromatic, aliphatic, or contain both aromatic and aliphatic groups and can be saturated or unsaturated. For instance the hydrocarbon radicals can be methyl, ethyl, propyl, amyl, isoamyl, stearyl, vinyl, allyl, phenyl, tolyl, xylyl, or benzyl. The chlorine and bromine halosilicanes, being readily available, are preferably used in the preparation of the silicon-containing compounds described herein. The corresponding fluorine and iodine halosilicanes, for example, diethyl silicon difluoride and dimethyl silicon-diiodite can also be used. These hydrocarbon silicon halides can be readily obtained by reaction of the corresponding silicon tetrahalide with a Grignard reagent. By varying the amount of Grignard reagent with respect to the silicon tetrahalide, the amount of halogen in the resulting hydrocarbon silicon halide is likewise varied. It is evident that the Grignard reagent may contain in the organic portion inert linkages such as an ether linkage although it is preferred that the reagent has a hydrocarbon radical.

The polyhydric alcohol with which the above hydrocarbon halosilicanes are reacted can be either monomeric or polymeric. Examples of these alcoholic compounds include polyhydroxyalkanes, polyhydroxycycloalkanes, and polyhydroxyalkenes such as ethylene glycol, glycerol, butylene glycol, pentamethylene glycol, hexamethylene glycol, pentaerythritol, sorbitol, mannitol, inositol, 1,4-dihydroxybutene-2, polymeric polyhydroxy compounds including polyvinyl alcohol, hydrolyzed interpolymers of a vinyl ester with a polymerizable compound possessing a single ethylenic double bond such as hydrolyzed vinyl acetate-ethylene interpolymers. It is preferred that the polyhydric alcohol be free from acidic or similar groups which would react with the silicone.

It is to be understood that silicon containing materials are obtained when any hydrocarbon silicon halide is reacted with a polyhydric alcohol. When the silicon halide is a di- or tri-halide, polymeric materials are obtained even if a monomeric polyhydric alcohol is used. Thus, with ethylene glycol and a monohydrocarbon-trihalosilicane, the produce would be a crosslinked polymer having a stucture such as shown in the following:

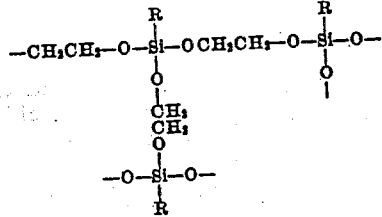

The polymers resulting from such a reaction are inert and generally infusible. As previously mentioned, the reaction of a dihydrocarbondihalosilicane with a dihydric alcohol is a linear polymer. These latter polymers are characterized by their ability to be dissolved and applied from solution as coating compositions, impregnating agents and adhesives. The highly polymeric linear polyesters can be spun into filaments and formed into films.

Although the trihydrocarbonmonohalosilicane reacts with polyhydric alcoholic materials, it is evident that they will not condense with a monomeric hydroxy compound to form a polymer but give the corresponding trihydrocarbon silicon esters. The monohalosilicanes will react with a polymeric or high molecular weight hydroxyl containing material to give a silicon-containing modified substance. By this reaction, such materials as wood, cotton, viscose, rayon, starch, polyvinyl alcohol, ethyl cellulose, etc., can be modified to give silicon-containing materials which exhibit such properties as increased resistance to water and to chemical reagents.

A mixture of hydrocarbon halosilicanes can be reacted with a polyhydric alcohol to give a modified product. These mixtures of hydrocarbon-halosilicanes can be obtained directly by the reaction of a Grignard reagent with a silicon tetrahalide and the hydrocarbonhalosilicanes formed will have a halogen content of from 1 to 3. By varying the amount of each of the monohalo, dihalo and trihalo silicanes in the mixture, the properties of the polymeric silicon ester resulting may be varied, from liquids to insoluble and difficultly fusible solids, depending on the polyhydric alcohol used.

As many apparently widely different embodiments of this invention may be made without departing from the spirit and scope thereof, it is to be understood that I do not limit myself to the specific embodiments thereof, except as defined in the appended claims.

I claim:

1. A process for obtaining a silicon-containing product comprising reacting a substance, which contains a plurality of alcoholic hydroxyl groups attached to a hydrocarbon residue, with a hydrocarbon silicanehalide having the formula $R_nSiX_{4-n}$, where $n$ is a positive integer of from 1 to 3, X is halogen, and R is a hydrocarbon radical, the ratio by weight of said substance to said silicanehalide being from about 1:1.4 to 1:3.3.

2. The process set forth in claim 1 in which said substance is polymer.

3. A process for obtaining a polymeric silicon-containing product comprising reacting a substance, which contains a plurality of alcoholic hydroxyl groups attached to a hydrocarbon residue, with a dihydrocarbon dihalosilicane having the formula $R_2SiX_2$, where X is halogen and R is a hydrocarbon radical, the ratio by weight of said substance to said dihydrocarbon dihalosilicane being from about 1:1.4 to 1:3.3.

4. A process for obtaining a polymeric silicon-containing product comprising reacting a substance, which contains a plurality of alcoholic hydroxyl groups attached to a hydrocarbon residue, with a dihydrocarbon dihalosilicane having the formula $R_2SiX_2$ where X is halogen and R is a hydrocarbon radical, the ratio by weight of said substance to said dihydrocarbon dihalosilicane being from about 1:1.4 to 1:3.3.

5. The process set forth in claim 1 in which said substance is a dihydric alcohol.

WILLIAM E. HANFORD.

REFERENCES CITED

The following references are of record in the file of this patent:

UNITED STATES PATENTS

| Number | Name | Date |
|---|---|---|
| 2,182,208 | Nason | Dec. 5, 1939 |
| 2,306,222 | Patnode | Dec. 22, 1942 |

Certificate of Correction

Patent No. 2,441,066.                                                                 May 4, 1948.

WILLIAM E. HANFORD

It is hereby certified that error appears in the printed specification of the above numbered patent requiring correction as follows: Column 4, line 45, for the word "polymer" read *polymeric*; and that said Letters Patent should be read with this correction therein that the same may conform to the record of the case in the Patent Office.

Signed and sealed this 29th day of June, A. D. 1948.

[SEAL]

THOMAS F. MURPHY,
*Assistant Commissioner of Patents.*